B. SYLVESTER.
INSECT-TRAP.
No. 188,760.  Patented March 27, 1877.
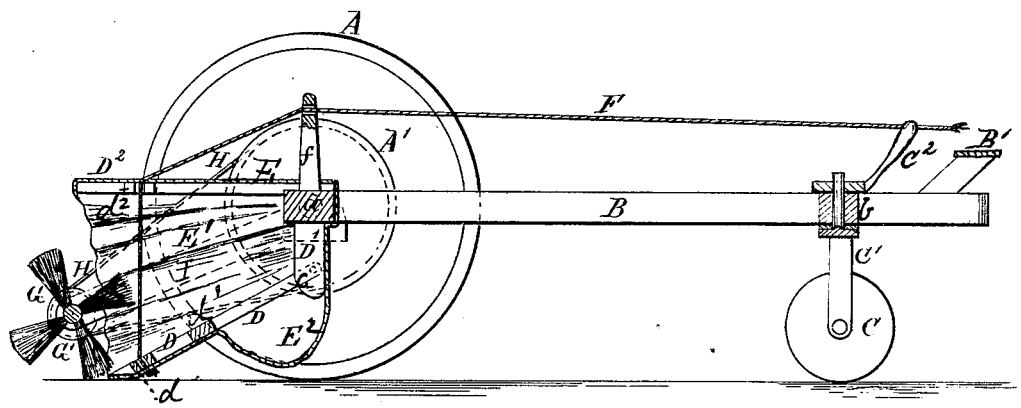

UNITED STATES PATENT OFFICE.

BENJAMIN SYLVESTER, OF ST. PETER, MINNESOTA.

IMPROVEMENT IN INSECT-TRAPS.

Specification forming part of Letters Patent No. 188,760, dated March 27, 1877; application filed February 27, 1877.

*To all whom it may concern:*

Be it known that I, BENJAMIN SYLVESTER, of St. Peter, in the county of Nicollet and State of Minnesota, have invented certain new and useful Improvements in Traps for Catching Insects; and I do hereby declare that the following is a full, clear, and exact description thereof, which will enable others skilled in the art to which it appertains to make and use the same, reference being had to the accompanying drawing, which is a vertical section of the trap, and to letters of reference marked thereon, which form a part of this specification.

A is a carrying-wheel, of which there are two, one being mounted upon each end of an axle, $a$. A frame-work consisting of two arms, B, connected by a girt, $b$, and carrying a driver's seat, B', extends rearward from the axle $a$. The arms B are of such length and are placed at such distance apart that a horse can work between them and can propel the machine over the ground, being attached to a whiffletree which is pivoted to the girt $b$. C is a guiding or steering wheel, the shank $C^1$ of which is pivoted or journaled in girt $b$ and provided with a hand-lever, $C^2$, arranged within convenient reach of the driver while riding in seat B'. At each end of the axle $a$ there is a depending hanger, $D^1$, to which there is pivoted, at $c$, a vibrating arm, D, these two arms D D being connected by horizontal girts $d$ and $d^1$. Immediately above the arms D there are two stationary arms, $D^2$, also connected by a horizontal girt, $d^2$. The arms $D^2$, girt $d^2$, and the axle $a$ form a rectangular frame, over which is stretched a cover, E, the space between the arms D $D^2$ at each end of the trap being filled with a suitable flexible material, $E^1$. To the lower arms D and girts $d$ $d^1$ is also attached a flexible covering, which hangs down loosely in rear of girt $d^1$, between that girt and the axle $a$, forming a bag or pouch, as indicated at $E^2$. This last-described part of the trap, consisting of the arms D $D^2$, their connecting-girts, and the covering E $E^1$ $E^2$, I usually denominate the cage. A cord, F, is connected with girt $d$ or $d^1$, and passes over or through standard $f$ and rearward to within reach of the driver. A revolving brush, G, is mounted in supporting-bars I. (Shown in dotted lines.) A belt, H, passes around a grooved wheel, A', on one of the carrying-wheels A, and a corresponding pulley, G', on the shaft of the brush G, thus causing the brush to rotate rapidly as the device moves forward over the ground and sweeps the grasshoppers or other insects into the cage.

By means of the cord F the height of the front part or edge of the apron or of the girt $d$ from the grass or the grain or the ground may be indicated, and by a sudden upward jerk upon this cord any accumulation of grasshoppers on the apron between girts $d$ $d^1$ may be readily delivered into the pouch or bag $E^2$.

When the device is made of suitable size it may be propelled by hand instead of horsepower.

I do not wish to be limited to the use of any particular material for the parts E $E^1$ $E^2$, but prefer to make a portion at least of them of a net-work, or otherwise reticulated material, in order that there shall be no returning currents of air produced by the revolving brush to interfere with driving the insects into the cage.

What I claim is—

1. The combination of the revolving brush, the cage provided with the hinged lower portion, and means for raising or lowering said hinged lower portion, substantially as set forth.

2. In combination with the revolving brush and the cage, the supporting-frame and the guiding-wheel C, arranged within reach of the driver while riding in his seat, substantially as set forth.

In testimony that I claim the foregoing as my own I affix my signature in presence of two witnesses.

BENJAMIN SYLVESTER.

Witnesses:
LEWIS SWENSON,
JOHN PETERSON.